Figure 1:
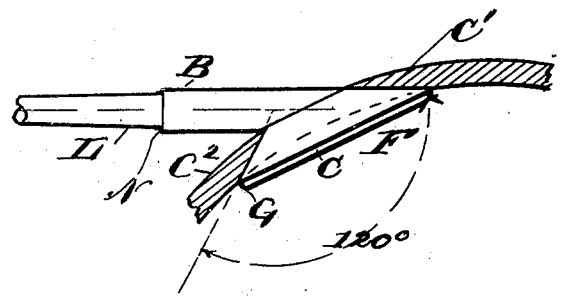

July 14, 1931.  E. W. STOLER  1,814,531

WIRE SPOKE

Original Filed April 13, 1927

INVENTOR.
Edward W. Stoler
BY
ATTORNEY.

Patented July 14, 1931

1,814,531

UNITED STATES PATENT OFFICE

EDWARD W. STOLER, OF MANSFIELD, OHIO, ASSIGNOR TO KELSEY-HAYES WHEEL CORPORATION, OF DETROIT, MICHIGAN, A CORPORATION OF NEW YORK

WIRE SPOKE

Original application filed April 13, 1927, Serial No. 183,439. Divided and this application filed April 16, 1928. Serial No. 270,283.

The invention relates to resilient wire spokes employed in the construction of pneumatic wheels and the particular objects are to construct a wire spoke of such a form that the material of which the spoke is constructed will not be broken or put under a strain while the hub end thereof is being shaped for its position in the hub of the wheel, but the substance of which the spoke of the wheel is composed will retain its full strength throughout without strain or distortion by bending in any part thereof.

Also the body of the spoke is reduced in diameter intermediate of its ends to increase its resilience at the portions thus reduced and to lessen the strain upon the attaching points of head and screw threaded portions.

Heretofore the head of the spoke has been bent at a right or other angle to permit of its insertion in the flanges of the hub. This action has resulted in weakening the head, since one side thereof will be distorted and put under compression and the other side will be put under a breaking strain or tension thus weakening the fibres on that side.

Also the weight of the vehicle comes upon the bent head at the angle of bending thus making the construction insecure and unreliable.

Further when the body of the spoke is retained of full diameter throughout the vibrations caused by pressure upon the spoke will be transmitted unchanged directly to the extremities and hence they will become more easily broken than if the body portion is reduced in diameter at more than one or more points in its length and the pressure is absorbed in vibrations of the body, which will not therefore act so directly upon the extremities as to fracture them.

The invention comprises a wire spoke having its head so connected with the hub that the plane of the outerside of the spoke will pass through the head so that a direct thrust and pull will be effected upon the spoke in the direction of the main axis of the spoke and there can be no bending or torsional strain of any kind upon the spoke.

The invention also includes a spoke body having enlarged terminal parts for the head and screw threaded portions respectively, a central portion of slightly reduced diameter to permit of flexing the spoke upon the enlarged extremities and having the parts intermediate of the extremities and central part still further reduced in diameter thus providing two longitudinally spaced flexing points in the body, one of which serves to absorb vibrations and prevent the screw threaded extremity from breaking and the other to absorb vibrations and prevent the head extremity from breaking, thus increasing the number of the straining or vibrating points and giving the spoke a double length of life in the swaged portions.

To accomplish these objects the spoke and head are constructed as illustrated in the accompanying drawings, hereinafter more fully described and specifically pointed out in the claims.

In the accompanying drawings Figs. 1, 2, 3 and 4 show the head set into the hub at different angles. Figure 5 is a section of a hub showing a side elevation of the improved spoke and head.

In these views A and B represent the enlarged extremities of the body, one A being screw threaded for attachment to the rim of the wheel, and the other B having an integral outwardly tapered or conical enlargement C one side C′ of which is substantially parallel with the plane of the tangent of the hub, and the other side C2 is arranged at substantially right angles to the longitudinal axis of the body of the spoke. In this manner the plane of the outer side of the spoke will always pass through the head, so that a direct thrust and pull will be effected, upon the spoke, and it cannot bend or break at the point of juncture with the head.

This construction permits the spoke to be attached to the hub without bending, and the pull exerted upon the spoke will not tend to bend the body or distort it in any way. Also the pull upon the flange C2 will be resisted by the extended portion C′ which is braced against the edge of the countersunk opening F in the hub.

The other extremity A of the body is of the same diameter as that of the head,

As stated in copending application 183,439 intermediate of these extremities is shown a central slightly reduced portion H which forms a point of less resistance that tends to absorb the vibration of the spoke and prevent it from affecting the extremities in such a manner as to fracture them.

To provide intermediate points of low resistance and thus provide further protection for the extremities, the spaces between the enlarged extremities A and B, and the central reduced portion H are still further reduced at I and J, by swaging and the extremities of the central portion H, are joined to the inner extremities of the heads and screw threaded portion by means of arcs K and L respectively.

The arcs are united with the enlarged extremities of the body with lesser arcs at M and N thus providing immediate reduction at these points, and reducing the power of the vibrations before they can affect the enlargement extremities A and B injuriously thus making the improved character of the spoke a protection for the head.

It will be observed that a greater amount of efficiency and a longer duration of life is obtained for the spoke and head by the mode of construction thus described, since the points of least resistance to flexion and vibration at I, and J, are removed as far as possible from the rigid enlarged extremities, A and B, and the reduced points also occur where the spokes cross each and prevent them from interferring with the action of each other.

Also the effect of swaging the metal to reduce the diameter thereof toughens and strengthens the metal so that the points of least resistance are not weaker than the other points.

It will be seen by reference to Figures 1, 2, 3 and 4 that the spokes B can be inserted in the hub G at any circumferential angle thereto, ranging from a complete tangent thereof to a radius thereof without bending the spoke since the plane of juncture between the head and end of the spoke is inclined to the major axis of the spoke.

In Fig. 1 the longitudinal axis of the spoke and one side of the spoke and head are shown to be parallel to the plane P of a tangent of the circumference of the hub, and the opposite side of the head is shown at an angle of 120 degrees to the longitudinal axis of the spoke.

Figure 2:
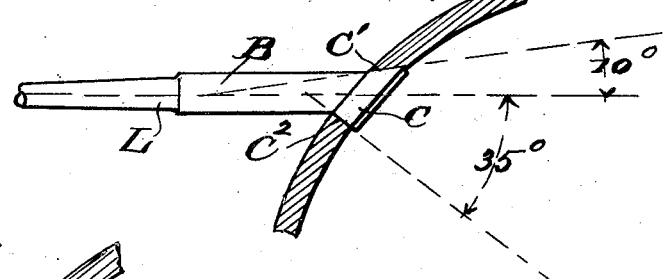
Figure 3:
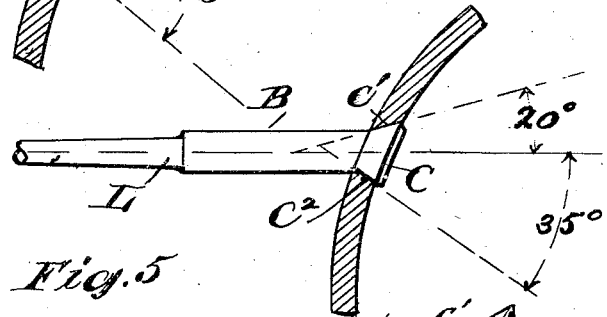

In Fig. 2 one side of the head C is shown to be at an angle of 10 degrees to the longitudinal axis of the spoke, and the other side at an angle of 35 degrees thereto, and in Fig. 3 the upper side of the head is shown at an angle of 20 degrees to the longitudinal axis of the rod.

Figure 4:
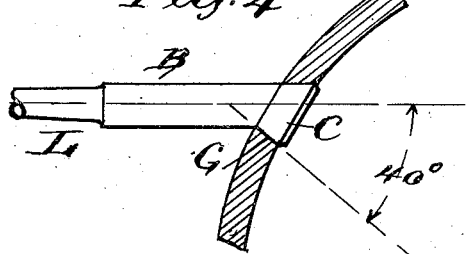
Figure 5:
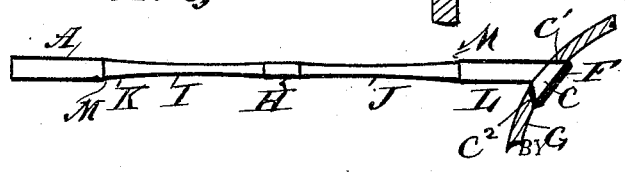

In Fig. 4 one side of the head G is shown to be at an angle of 40° to the longitudinal axis of the spoke, and the other side is parallel to the plane of a tangent of the circumference of the hub. The sides of the conical head are also at similar angles to the major axis of the cone subtended thereby.

In Fig. 5 the relation of the head to the entire spoke is shown.

These views illustrate the manner in which the head can be formed for insertion in the hub at any well known circumferential angle, without bending the neck of the spoke in the usual manner, thus greatly extending the life of the spoke.

Also the spoke can be produced in accordance with any commercial order that may be obtained and with the sides of the head set any angle desired, such as at 40 degrees, at 120 degrees, or at intermediate degrees, relative to the main axis of the spoke, to take the place of spokes having their necks bent to enter the spoke at a corresponding angle as has hitherto been the custom.

Having described what I claim as new and desire to secure by Letters Patent is:

1. In a tension wheel a hub member provided with cone shaped spoke receiving sockets extending in a substantially radial direction, spokes having headed ends received in said sockets and straight body portions extending tangentially of said hub member, the planes of junction between said body and head being substantially tangential to a circle within said hub member.

2. In a tension wheel a hub member provided with cone shaped spoke receiving sockets extending in a substantially radial direction, spokes having headed ends received in said sockets and straight body portions extending tangentially of said hub member, the planes of junction between said body and head being substantially tangential to a circle within said hub member and normal to the axis of said cone shaped sockets.

In testimony whereof I affix my signature.

EDWARD W. STOLER.